(12) United States Patent
Finlay et al.

(10) Patent No.: US 10,585,707 B2
(45) Date of Patent: Mar. 10, 2020

(54) DATABASE RESOURCE SCALING (71) Applicant: INTERNATIONAL BUSINESS MACHINES CORPORATION, Armonk, NY (US)

(72) Inventors: Ian R. Finlay, Uxbridge (CA); Christian M. Garcia-Arellano, Richmond Hill (CA); Adam J. Storm, Toronto (CA); Gennady Yakub, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 15/634,735

(22) Filed: Jun. 27, 2017

(65) Prior Publication Data

US 2018/0373567 A1    Dec. 27, 2018

(51) Int. Cl.
*G06F 9/455* (2018.01)
*G06F 9/50* (2006.01)

(52) U.S. Cl.
CPC .......... *G06F 9/5016* (2013.01); *G06F 9/5061* (2013.01); *G06F 2209/5019* (2013.01)

(58) Field of Classification Search
CPC ............. G06F 11/3452; G06F 11/3495; G06F 9/5016; G06F 11/3409; G06F 2201/81; G06F 3/0604; G06F 3/0631; G06F 3/0689
See application file for complete search history.

(56) References Cited

U.S. PATENT DOCUMENTS

| | | | |
|---|---|---|---|
| 6,961,835 B2 | 11/2005 | Lightstone et al. | |
| 7,469,329 B2 | 12/2008 | Kuczynski et al. | |
| 7,502,775 B2 | 3/2009 | Carroll et al. | |
| 7,694,102 B2 | 4/2010 | Garcia-Arellano et al. | |
| 8,434,088 B2 * | 4/2013 | Banerjee | G06F 9/5011 718/100 |
| 8,566,546 B1 * | 10/2013 | Marshak | G06F 3/0604 711/112 |

(Continued)

FOREIGN PATENT DOCUMENTS

WO     2015037011 A1    3/2015

OTHER PUBLICATIONS

Han et al., "Lightweight Resource Scaling for Cloud Applications," 2012 12th IEEE/ACM International Symposium on Cluster, Cloud and Grid Computing, 2012, p. 644-651, IEEE Computer Society.

(Continued)

*Primary Examiner* — Dong U Kim
(74) *Attorney, Agent, or Firm* — L. Jeffrey Kelly (57) ABSTRACT

A method, computer system, and a computer program product for resource scaling is provided. The present invention may include receiving a request for resources. The present invention may include receiving a request for a plurality of resources from a virtual device. The present invention may then include estimating a resource allocation based on a predetermined level of service based on the received request. The present invention may also include estimating a benefit curve of a workload for a plurality of tiers of resources based on the estimated resource allocation. The present invention may further include estimating a performance cost of the workload for the plurality of tiers of resources based on the estimated benefit curve.

20 Claims, 5 Drawing Sheets

(56) References Cited

U.S. PATENT DOCUMENTS

| | | | |
|---|---|---|---|
| 8,578,023 | B2 | 11/2013 | Satterfield et al. |
| 9,722,945 | B2 | 8/2017 | Siciliano et al. |
| 2005/0273643 | A1 | 12/2005 | Carroll et al. |
| 2005/0278381 | A1* | 12/2005 | Diao ................... G06F 9/5016 |
| 2010/0180275 | A1* | 7/2010 | Neogi ................ G06F 1/3203 718/1 |
| 2011/0145392 | A1 | 6/2011 | Dawson et al. |
| 2011/0258621 | A1 | 10/2011 | Kern |
| 2016/0094401 | A1* | 3/2016 | Anwar ................ H04L 41/142 709/223 |
| 2016/0321588 | A1 | 11/2016 | Das et al. |

OTHER PUBLICATIONS

Mell et al., "The NIST Definition of Cloud Computing," National Institute of Standards and Technology, Sep. 2011, p. 1-3, Special Publication 800-145.

Neves, "Multi-Dimensional Self-Tuning in Transactional Memory," Técnico Lisboa Thesis, Oct. 2015, p. 1-80, Instituto Superior Técnico, University of Lisbon.

Storm et al., "Adaptive Self-Tuning Memory in DB2," VLDB '06, Sep. 12-15, 2006, p. 1081-1092, VLDB Endowment, ACM, Seoul, Korea.

* cited by examiner

DATABASE RESOURCE SCALING

BACKGROUND

The present invention relates generally to the field of computing, and more particularly to resource scaling. An application running in a cloud environment may perform optimally when additional resources are available. The amount of resources, such as memory, used for an application may alter the performance of a computing device, whether stand alone, connected virtually or connected in a cloud environment. The more resources allocated for application operations may create better computing performance for the end user.

SUMMARY

Embodiments of the present invention disclose a method, computer system, and a computer program product for resource scaling. The present invention may include receiving a request for a plurality of resources from a virtual device. The present invention may then include estimating a resource allocation based on a predetermined level of service based on the received request. The present invention may also include estimating a benefit curve of a workload for a plurality of tiers of resources based on the estimated resource allocation. The present invention may further include estimating a performance cost of the workload for the plurality of tiers of resources based on the estimated benefit curve.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for scaling resources. As such, the present embodiment has the capacity to improve the technical field of resource scaling by using built-in known computing resources to estimate a computing workload performance benefit with a specified amount of resources. More specifically, a user operating a computing device may obtain a predetermined level of service by a resource scaling program obtaining an estimated benefit for each level of service offered by a service provider. The estimated benefit may enable a user or a cloud service provider to either manually reallocate computing resources over a network or automatically allocate computing resources over a network to obtain a better performing computing experience.

As previously described, an application running in a cloud environment may perform optimally when additional resources are available. The amount of resources, such as memory, used for an application may alter the performance of a computing device, whether stand alone, connected virtually or connected in a cloud environment. The more resources allocated for application operations may create better computing performance for the end user. Database engines, for example, with built-in mechanisms that accurately estimate the cost of an operation based on a given set of resources may be extended to compute the same cost with a varying amount of resources. A database engine may be an example of a cloud application running on virtual machines.

Cloud applications running on virtual machines may have an improved throughput if provided additional resources. Generally, software that depends on a disk input-output (IO) to complete a user operation may benefit by a reduced IO performance time when memory is used as a cache. Memory used as cache may reduce the response time for a user request. Quantifying the amount of improved throughput associated with additional resources (e.g., memory) may pose a problem. Requiring a separate hardware piece to be installed on the physical machine running the cloud application to improve throughput may pose an additional problem. The evolution of virtual computing environments has expanded the possibilities of resource (e.g., memory) sharing by allowing resources on a low benefiting virtual machine to be used on a high benefitting virtual machine without altering hardware. A virtual machine may be transparently moved to a different physical machine that either has additional resources to offer other virtual machines in a computing network or needs additional resources in a computing network. Therefore, it may be advantageous to, among other things, provide a method that exploits existing built-in computing mechanisms by estimating a benefit curve that automatically scales resource configuration in a virtual computing environment or in a cloud computing environment.

Sharing resources may be common in large scale cloud environments that include physical machines, virtual machines, or both physical machines and virtual machines, however, resources sharing may also benefit using one physical machine and one virtual machine. Users (e.g., customers or clients) using applications in a cloud environment may expect flexibility in scaling an application at all levels of the stack, such as the application servers that run the server side of the application to the database engine being used by the server application. A stack may be related to cloud computing as a broad range of services that may share resources such as servers, networks, applications, memory (e.g., storage), central processing units (CPUs) and database engines.

A cloud-based or a virtual machine-based resource sharing network environment may benefit from creating a method to automatically and reliably estimate how to scale the resources (e.g., memory) of a cloud application running on a virtual machine for a workload and exploiting the estimates to provide automatic scaling of resource configuration for an optimal level of service. The estimates may also be used to identify user applications that may benefit from additional resources, such as memory, and may be targeted to either enable automatic scaling or may increase the memory dedicated to the cloud application running on a virtual machine. Cloud computing environments enable flexibility in resource scaling and resource sharing and users may expect a level of flexibility in computing services and computing speed.

According to at least one embodiment, the resource scaling program may properly estimate the benefit of scaling resource usage of a cloud application running on a virtual machine using existing built-in computing mechanisms that may compute the cost and performance of an operation for a given set of resources. One existing built-in computing mechanism may include a query optimizer and simulations in a self-tuning memory manager. The resource scaling program may use the calculated resource estimates at a multitude of resource tiers to automatically scale the resource configuration to provide a predetermined level of service or to identify applications that may get the most benefit from scaling. Service providers may offer the benefit of scaling resources to provide a predetermined level of service to users. Additionally, service providers may offer or advertise to both customers and non-customers available increased level of services.

The present embodiment may produce an estimated benefit curve using known methods and using the produced benefit curve as a means to automate resource tuning based on the created benefit curve and one or more input performance objectives. Known methods may accurately estimate the cost of an operation for a given set of resources and may exploit the cost estimates for query plan optimization and self-tuning memory, however, the present embodiment may use the calculated benefit curve at a multitude of resource tiers and the cost estimates for an operation to provision resources to meet user performance objectives. The method to compute benefit estimates may also be extended to handle tiered storage options or other resources that may be variably provisioned. Performance metrics may indicate a benefit from moving a workload up to the next tier of service or may provide tiers of service based on performance objectives. The resource scaling program may estimate a benefit of a single tier of a resource or the resource scaling program may estimate a benefit curve for multiple tiers of resources.

The present embodiment may provide a method to compute benefit estimates in the form of a benefit curve to provision more or less resources to a workload. The benefit estimates may be calculated using existing and conventional methods. One use of the calculated benefit curve may include automatically tuning memory provisioning based on a performance target, such as a target defined in a Service Level Agreement (SLA). SLAs may offer metrics, such as, network reliability, responsiveness, computing speed and efficiency.

An alternative use of the calculated benefit curve may include an informational resource for users to make tuning choices on a computing device or for a provider to market computing device upgrades to a client. Exploiting the benefit curve for provisioning computing resources to cloud applications running on virtual machines for a user workload may provide an end user with decision making capabilities for provisioning computing resources. Thus, the benefit curve represents a relative improvement in workload performance depending on the amount of resources that may be provisioned to the cloud applications running on virtual machines for the user computing device.

Additionally, exploiting benefit curve estimates may provide automatic computing resource provisioning to maintain or increase a quality of service (QoS) target for the user device workload. The resource scaling program may scale resource decisions based on a benefit of adding or a cost of removing a resource that may be calculated based on a simulation. The resource scaling program may use the estimated cost-benefit curve calculated as a result of auto-scale simulations to satisfy a QoS based on the benefit metric. Exploiting the benefit curve may provide one method the resource scaling program may use to provision additional computing resources to, for example, a database engine running a workload to meet performance objectives. An example of the product of a benefit curve may include computing the cost of a computer operation using a given set of resources at one point in time or over a period of time. Additionally, the product of a benefit curve may, for example, include computing the cost of an operation using more than one set of estimated resources for a given workload at one point in time or over a period of time. The cloud provider may expose the benefit curve computed by the database engine to the user, for example, in a chart showing the available options it supports for increasing the amount of resources on the database engine and the estimated relative performance improvement resulting from this change.

Automatically exploiting the benefit curve may allow the resource scaling program to provision additional computing resources to a database running a workload to meet performance objectives. For example, the benefit curve is calculated and used to initially determine the workload cost for the initial amount of memory available to a database. As the workload changes, the computed benefit curve of memory provisioning changes, which also changes the required amount of memory for the same constant (e.g., same level of service). The cloud provider may then perform an automatic memory provisioning or virtual machine relocation based on the changing benefit curve to maintain this level of service or to maintain the performance at the determined workload cost.

The present embodiment may use the calculated benefit curve to automatically manage resource provisioning to virtual machines in a cloud environment to maintain a level of service as the workload may change over time. As the workload changes, the calculated benefit curve of resource provisioning may also change. The calculated change in the benefit curve may be used by the cloud service provider to determine the proper amount of provisioning at a particular time to ensure the contracted level of service is maintained. The cloud service provider may use the calculated benefit curve to determine the optimal amount of resources needed to maintain a constant and specific cost for the workload as estimated with the known costing calculations (e.g., cost model data used for tuning memory in a database engine). Next, the cloud service provider may perform an automatic provisioning or may perform a virtual machine relocation to provide the amount of memory needed to maintain a predetermined level of service available to a cloud application running on a virtual machine.

One method that may assist the resource scaling program to estimate a benefit curve may include the use of a cost-based query optimizer to estimate the performance benefit additional memory may offer a given workload. The cost-based query optimizer may determine an optimal access plan when a user query is run by estimating the cost of alternative query plans for the current amount of available memory resources and indexes available. Then, the query optimizer may choose the plan that results in the lower cost. The cost-based evaluation in the query optimizer may also be used to advise, for example, on combinations of potential indexes that may independently benefit the workload and then choose the combination of indexes that may produce the lowest overall cost for a given workload. The present embodiment of the resource scaling program may use the cost-based query optimizer calculation to perform a cost analysis for a varying amount of resources to determine the relative benefit curve for using additional resources when running a user workload.

Another method that may assist the resource scaling program to estimate a benefit curve may include the use of simulations in a cost-based self-tuning memory manager to evaluate the relative performance benefit additional memory may give to a workload. The cost-based self-tuning memory manager may tune multiple memory areas by first computing the benefit each memory area may provide to the throughput of the users of that memory area within the cloud computing environment running on virtual machines. The cost-based self-tuning memory manager may use a common metric (e.g., memory size, cache size or buffer pool) and may tune the memory by taking memory from a lower benefitting (e.g., higher cost) device and providing the taken memory to a higher benefiting (e.g., lower cost) device. When applied properly, the benefit may equalize the memory areas to maximize the overall throughput of the database or networked system. This cost benefit calculation may include each memory area by performing a minimum impact simulation of the execution of the same workload with additional memory. Then the cost benefit calculation may include dividing the difference between the actual measured cost and the estimated cost with the difference between the actual memory available to the cloud applications running on virtual machines and the simulated memory. This common metric may also, for example, be used to tune the memory between multiple database engines running on the same device by accumulating the benefit of all memory consumers in each database engine and comparing the accumulated values.

The present embodiment may then incorporate a known method of oscillation avoidance (i.e., oscillation control) when tuning the computing system. When a computing tuning system approaches stability, the computing tuning system may begin oscillating between two or more solutions in an effort to converge solutions (i.e., in an effort to find the best solution). Optimizing oscillation avoidance may preserve efficiency in the computing tuning system by not continually adjusting the amount of resources once they reach a near optimal level and the amount of resources are fulfilling the predetermined level of service contracted in the SLA.

According to an alternate embodiment, a cloud service provider may provide a user of cloud applications running on a virtual machine with a return on investment curve for resource provisioning. The return on investment curve may allow the user to decide whether the provisioned memory may produce a benefit for the workload or whether the provisioned memory may not produce a benefit for the workload. For example, if the user decides to provision memory to a database engine, the user may decide the amount of memory to provision to reach the sought throughput improvement.

According to an alternate embodiment, a cloud service provider may use the benefit curve to determine which users in the cloud environment may benefit more than others by acquiring additional resources for the user operating cloud applications running on a virtual machine. This benefit curve data may be used to target users or customers, advertise to customers to offer upgraded service, or provide the cloud service provider with other selling strategies. For example, the ability of a cloud service provider to identify applications and customers that may benefit may allow the cloud service provider to perform a temporary memory increment on a trial basis on the user device to show the benefit of the resulting temporary materialization.

According to an alternate embodiment, the resource scaling program may be extended to the IO subsystem. A cloud service provider may provide flexibility in terms of what IO subsystem may be used for cloud applications running on virtual machines and the cloud service provider may offer different performance characteristics to the user. The resource scaling program may use the cost of an operation to calculate a performance benefit curve associated with multiple tiers of disk speeds available to a virtual machine to store data. Additionally, the calculated performance benefit curve may be associated with varying amounts of memory. The resource scaling program may also be extended to network resources.

Figure 1:
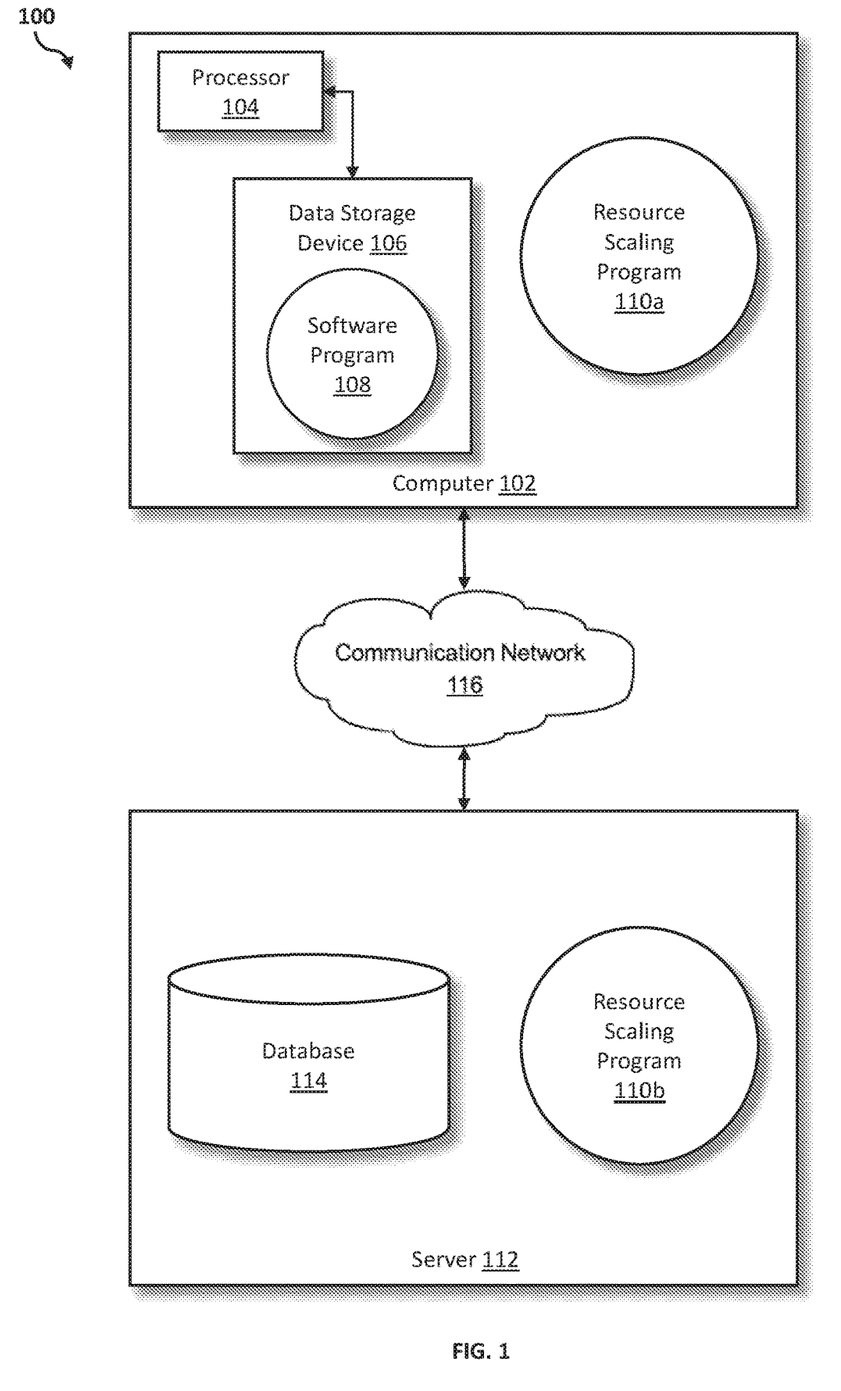
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a resource scaling program 110*a*. The networked computer environment 100 may also include a server 112 that is enabled to run a resource scaling program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the resource scaling program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the resource scaling program 110a, 110b (respectively) to scale virtual or cloud computing resources to enable an optimal performance benefit at a lower cost. The resource scaling method is explained in more detail below with respect to FIG. 2.

Figure 2:
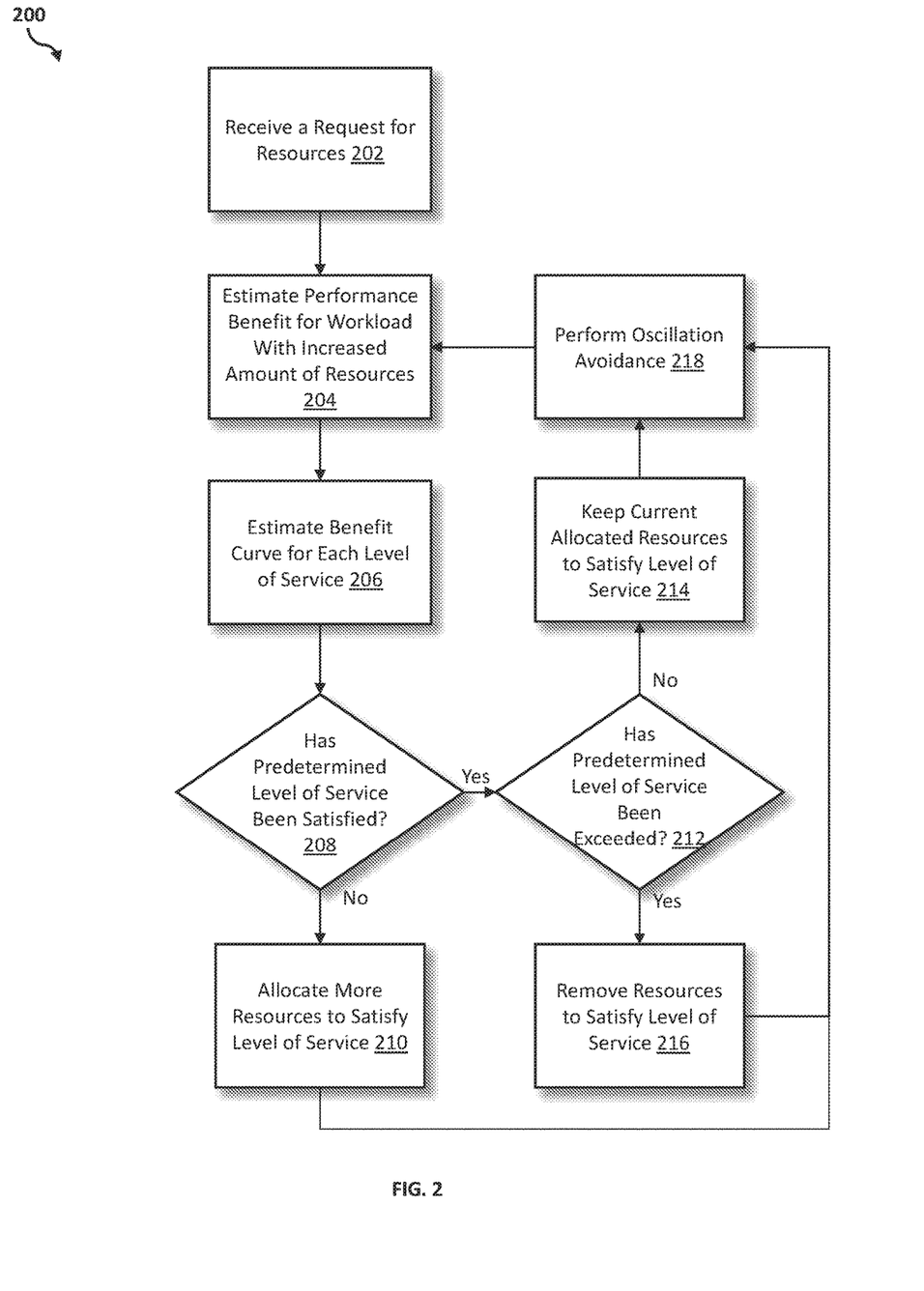
FIG. 2 is an operational flowchart illustrating a process for resource scaling according to at least one embodiment.

Referring now to FIG. 2, an operational flowchart illustrating the exemplary resource scaling process 200 used by the resource scaling program 110a, 110b according to at least one embodiment is depicted.

At 202, a request for resources is received. A user operating a computing device (e.g., computer 102) may need computing resources allocated to perform either normal or optimal computing operations. Normal or optimal computing operations may be stated, for example, in a SLA between a service provider and a customer. The SLA may have a clause that offers users a level of service that may be dictated by, for example, faster computing speeds for a higher cost. A computing device may operate as a virtual machine that may simulate another device or resource communicating over a communication network 116. Virtualization may create a computing environment that includes using resources of another computing device independent of a physical infrastructure. A computing device may also operate in a cloud environment that may communicate over a communication network 116. Basic computing may require a computer 102 to run an operating system, applications and various other software programs (e.g., software program 108). The request for resources may depend on the size of the operating system and the number and size of the applications used on a virtual machine by a user coupled with the predetermined level of service a user may have contracted in the SLA. The number of applications, the application size and the operating system requirements may affect resource consumption. Additionally, depending on the number of applications used and the size of the applications, the resource scaling program 110a, 110b may continuously adjust resource needs based on the received request and the predetermined level of service.

For example, user A is operating a personal computer running the computer operating system and X amount of applications in a cloud environment. User A has a SLA with a service provider. The SLA has a clause, in addition to network uptime and other basic SLA clauses, to provide user A operating the personal computer to Y response time irrespective of the X number of applications. Y response time requires a predetermined level of service for user A and the service provider can allocate resources, such as memory, to user A at different tiers. When user A is operating X amount of applications, the tier of memory to provide Y response time may require 32 GB or may require 512 GB of memory.

Next at 204, if a request for resources is received at 202 or if oscillation avoidance has been performed at 218, then a performance benefit is estimated for a workload with an increased amount of resources. The resource scaling program 110a, 110b may determine the proper amount of resource provisioning to a computing device while offering constructed levels of service to users. For example, the level of service provided by a service provider may be stated in the SLA. The SLA may offer fluctuating resources provisioned to a user computing device to keep a predetermined level of service viable.

The computing device may be allocated a certain amount of resources, however, to maintain a level of service to a user operating a computer 102, resource amounts may be adjusted accordingly. Resource allocation (i.e., provisioning) may not be adjusted (i.e., remain the same) or may increase or decrease to maintain a level of service to a user. Once a level of service is contracted between the user and the service provider, the resource scaling program 110a, 110b may choose the amount of resources at the lowest cost that may provide the contracted level of service. Internally, the application (e.g., database engine) may decide how to best utilize the resources for the workload being driven through the system based on the current amount of resources provisioned by the resource scaling program 110a, 110b. A database engine, for example, may choose an appropriate query plan for each query in the workload. This additional variable (i.e., the different query plans) may be considered in the computation of the benefit metrics used by the resource scaling program 110a, 110b. For example, the computation may make assumptions about the query plan selections that may be performed at each level (e.g., tier) of resources.

The resource scaling program 110a, 110b may then provision an amount of resources that may maintain the contracted level of service. Provisioning resources in an SLA, for example, may use tiers of memory (e.g., 16 GB, 32 GB, 64 GB, 128 GB, 256 GB or 512 GB) for provisioning more or less resources, however, the SLA may guarantee a level of service and charge users for the level of service. The query plan chosen with the lowest cost may move the user up to the next tier based the service level stated in the SLA.

The user may purchase a level of service instead of a fixed tiered amount of resources. The service provider may use the resource scaling program 110a, 110b to automatically move a user to a tier that may maintain the predetermined level of service based on calculations of the benefits to automatically move a user to a particular tier. The benefits calculated may be used for efficiency of the allocated resources, for example, if user A is operating few applications in a cloud environment and user B is operating many large applications, then user A may be operating a low benefitting machine (e.g., virtual computer or cloud computer) and user B may be operating a high benefitting machine (e.g., virtual computer or cloud computer). A low benefitting machine may be provisioned less resources to achieve an optimal level of performance (i.e., service) and a high benefitting machine may require more resources to achieve an optimal level of performance (i.e., service). Automatically allocating resources may provide an efficient method to raise performance for users by continually calculating a benefit of an increased amount of resources to estimate how the additional resources may benefit a user.

The performance benefit may be estimated for a current workload using a current amount of resources and a current workload for an increased amount of resources. The performance benefit may continually be estimated at current resource levels and increased resource levels to maximize the benefit to computing devices in a virtual environment or in a cloud environment. Irrespective of whether more resources have been allocated, the current amount of resources has been kept, or resources have been removed from a computing device, the resource scaling program 110a, 110b may repeatedly estimate the performance benefit for a workload with an increased amount of resources to determine the benefit more resources may offer a computing device and to satisfy a predetermined level of service for users.

One method of estimating the performance benefit may include the use of a cost-based query optimizer to estimate the benefit additional resources may provide to the workload. The cost-based query optimizer may determine an optimal plan for a user query by estimating the cost of alternative query plans for the current amount of available resources and indexes. Once the optimal plan is estimated, the cost-based query optimizer may choose a plan that results in a lower cost. The cost evaluation may provide, for example, an optimal combination of indexes that may independently benefit the workload and then choose the combination of indexes that produce the lowest overall cost of the workload. The resource scaling program 110a, 110b may then run the cost-based query optimizer to estimate the workload with an increased amount of resources to estimate the benefit the user may obtain from the additional resources.

One other method of estimating the performance benefit may include a cost-based self-tuning resource manager to estimate the benefit additional resources may provide to a workload. A cost-based self-tuning memory manager, for example, may tune multiple memory areas by computing the benefit each area may provide to the throughput of the users of that memory area within a database engine using a common metric. The cost-based self-tuning memory manager may then tune the memory by taking the resource from a lower benefitting (i.e., higher cost) computing device and providing the resource to a higher benefitting (i.e., lower cost) computing device in a virtual network or in a cloud network. A cost benefit calculation may include each resource area by performing a minimum impact simulation of the execution of the same workload with additional resources, then dividing the difference between the actual measured cost and the estimated cost with the difference between the actual resource available to the virtual machine (e.g., database engine) and the simulated resource. This same common metric may also be used to tune the resources available between multiple virtual machines running on the same machine (e.g., computing device) by accumulating the benefit of each resource used by a particular virtual machine and comparing the accumulated values. The objective is to equalize the benefit from a plurality of resource areas and a plurality of user computing devices to maximize the overall throughput of the computing system. A computing system may include a virtual machine running a plurality of user computing devices in a virtual network or on a cloud network.

The resource scaling program 110a, 110b may, for example, implement equalized memory areas by calculating the benefit of giving more memory to a particular memory area, then use the particular memory for a cycle and compare the benefits. After one use cycle, if one memory area has a benefit of 3 and another memory area has a benefit of 2, then the resource scaling program 110a, 110b may provision memory from the memory area associated with a benefit of 3 to the memory area associated with a benefit of 2 to equalize the benefits and to maximize the benefit measurements. The resource scaling program 110a, 110b may also provision equalized memory benefits by using more than one cycle, for example, if a memory area benefits by getting more memory at a particular point in time, then memory may be provisioned or moved to another memory area and the benefit may be calculated over more than one cycle.

The resource scaling program 110a, 110b may estimate the performance benefit for a user workload with an increased amount of resources while estimating the cost for decreasing the amount of resources assigned to the computing device. The resource scaling program 110a, 110b may use, for example, known methods previously described to offer a level of service to a user or to advertise a level of service to users. The resource scaling program 110a, 110b may estimate the performance benefit by calculating how much of a benefit a user may experience if the user were to have more resources allocated to the user computing device. The benefit projections may be used to offer better services to users (e.g., customers). Moving and re-allocating resources to achieve an optimal performance benefit may create an attainable level of service for users (e.g., customers). Exploiting both query plan optimization methods and self-tuning methods at increased resource levels for a workload may provide a method to provision resources to meet user (e.g., client) performance objectives.

Then at 206, a benefit curve for each level of service is estimated. A benefit curve may be estimated by calculating a flow from the resource benefit for a previous interval and extrapolating a curve from the previous interval resource benefit calculations. The resource scaling program 110a, 110b may extrapolate a benefit curve based on the calculated benefit flow for the previous interval to provide a usable metric for scaling resources. The resource scaling program 110a, 110b may calculate the benefit at a particular interval (e.g., cycle) and the calculation may show what level of service is being provided. After tuning a resource, the benefit curve may provide benefit data for each point in time, moving from one point to another and a curve may be shown by calculating many different points in time.

A benefit curve may be used for automatically allocating different types of resources, such as memory (i.e., storage), CPUs, or IO subsystems. The resource scaling program 110a, 110b may perform a cost analysis for varying amounts of resources to determine the relative benefit curve for using additional resources when running a user workload. Utilizing a benefit curve for provisioning computing resources to a virtual machine running cloud applications for a user workload may benefit end users by providing automatic resource provisioning to maintain or increase a QoS target. An alternate embodiment of utilizing a benefit curve to provision computing resources may allow end users to make computing resource decisions by providing data that shows a relative improvement in performance of the workload for incremental changes in resources provisioned on the virtual machine. Another alternate embodiment of exposing a benefit curve to provision computing resources may allow a service provider to estimate the benefit of additional resources to a user computing device and may allow the service provider to use the data to present advertising material to the user to show the benefits a user may receive at upgraded levels of service.

The benefit curve may be calculated at a current workload and when approaching optimal resource provisioning. The curve may flatten out as the memory provisioned at a workload gets closer to optimal values. The curve may also be calculated over time (i.e., more than a single value) and as the computing system moves through the plurality of different memory tier calculations, therefore many points on the curve may exist to extrapolate a benefit curve of a workload while using a particular amount of resources. If more memory is needed on a computing device for a predetermined level of service, and the resource scaling program 110a, 110b provisions more memory to the computing device, then a new benefit curve may be calculated. For example, the first computation may be of memory at a workload at a particular time, then the next computation may use additional memory at the same workload at another time. The curve may be calculated at intervals and may be continuously checking memory benefit levels and comparing the memory benefit levels to the service levels. The resource scaling program 110a, 110b may continuously calculate a benefit of resources that continuously moves towards a target of leveling out the benefit curve calculation to optimal values. A computing device may not benefit if the resources allocated are continually at higher levels than necessary to maintain a level of service, rather, a benefit curve that is level may show optimal resource usage at the lowest cost. The resource scaling program 110a, 110b may estimate the measured benefit curve and the cost at each resource tier and, as the amount of resources change, the points on the graph may provide a slope to show the cost benefit analysis at each resource tier.

Next at 208, the resource scaling program 110a, 110b determines if a predetermined level of service has been satisfied. The level of service may be predetermined by the SLA between the service provider and the user. The level of service, for example, may include continually measuring provisioned resources with the user workload to keep response times at a certain speed for computing operations. The benefit curve calculations may be processed by the resource scaling program 110a, 110b to determine if the user may or may not need more resources provisioned to satisfy the level of service predefined, for example, in the SLA. A computing device that may require more provisioned resources to satisfy a predetermined level of service may be a high benefitting machine. A high benefitting computing device may require more provisioned resources to maintain a level of service.

If the predetermined level of service has not been satisfied at 208, then the resource scaling program 110a, 110b allocates more resources (i.e., an additional portion of resources or an additional tier of resources) to satisfy the predetermined level of service at 210. If the user computing device workload and allocated resources are not operating at the predetermined level of service, then the resource scaling program 110a, 110b may, for example, move the user up to a higher memory tier, perform oscillation avoidance at 218 and then estimate the performance benefit for the workload with the increased amount of resources at 204. The resource scaling program 110a, 110b may identify the additional amount of resources required to satisfy the predetermined level of service.

If additional resources are allocated, the user computing device may result in a positive benefit at an increased level of service. To receive more resources, the predetermined level of service in the SLA may not have been achieved, therefore, the resource scaling program 110a, 110b may allocate more resources to the user computing device to increase the level of service to the predetermined service levels. For example, the positive benefit from the extra allocated resources may provide faster response times for a user since the user computing device was operating with a deficit of resources to obtain the level of service defined in the SLA.

If the predetermined level of service has been satisfied at 208, then the resource scaling program 110a, 110b determines if the predetermined level of service has been exceeded at 212. Since the predetermined level of service has been satisfied at 208, the resource scaling program 110a, 110b may determine if an excess of resources has been provisioned to the user computing device. An excess of resources may not benefit a user operating a low benefitting computing device, therefore, the excess resources may be allocated to another device in the virtual network or the cloud network that may benefit more. Reallocating resources form a low benefitting computing device to a high benefitting computing device may create a computing environment that includes multiple users operating at optimal levels. The resource scaling program 110a, 110b may identify the change in benefit required to satisfy the predetermined level of service and then either keep the current amount of resources or remove resources to maintain the predetermined level of benefit. If resources are in excess and some resources are removed, the resource scaling program 110a, 110b may use the benefit curve estimate to determine how many resources should be removed from the user operating the low benefitting computing device and reallocated back into the virtual network or cloud network.

If the predetermined level of service has not been exceeded at 212, the resource scaling program 110a, 110b keeps the current allocated resources to satisfy the level of service at 214. No change in resource allocation may be made to reach the predetermined level of service since the user may already be receiving the level of service contracted in the SLA. If the current level of service is satisfied at the current amount of allocated resources, the estimated performance benefit workload may be estimated with an increased amount of resources at 204 after oscillation avoidance has been performed at 218. Keeping resources at a current amount may indicate the predetermined level of service in the SLA has been achieved and not exceeded (i.e., proper amount of resources allocated to provide the predetermined level of service). The resource scaling program 110a, 110b may continually estimate the performance benefit for a workload with an increased level of service to estimate the benefit a user computing device may achieve if resource amounts were to increase since workloads may change. For example, if a user is experiencing the level of service contracted in the SLA for a particular workload, and although no extra resources may have been allocated to the user device, the resource scaling program 110a, 110b may still estimate the performance benefit for the user workload with an increased amount of resources at 204 to continually calculate the benefit the user may have available at the current workload.

If the predetermined level of service has been exceeded at 212, then the resource scaling program 110a, 110b removes resources to satisfy the level of service at 216. A computing device that may not require more provisioned resources to satisfy a predetermined level of service may be a low benefitting machine. The low benefitting machine in a computing environment may be operating with an excess amount of resources and if some of the excess resources are removed and provisioned to another user, then the low benefitting machine may not experience a decrease in service level. If a user computing device has an exceeded positive benefit, then resources may be provisioned elsewhere (i.e., removed from low benefitting computing device) while the resource scaling program 110a, 110b maintains the predetermined level of service. The service provider may efficiently use resources by removing resources from a user when the SLA is being exceeded if the service provider can accurately predict benefit and cost calculations for the amount of resources that can be removed while maintaining the contracted SLA. Removing resources from a computing device may indicate that the computing device is operating with more resources than are being used and the predetermined level of service is being achieved, therefore, resources in the virtual network or the cloud network may benefit other computing devices in the network if allocated accordingly.

For example, a user device is operating a workload at the predetermined level of service, however, the amount of resources allocated to the user is in excess of what is being used. The resource scaling program 110a, 110b may then remove the excess resources from the user device and reallocate the excess resources to a higher benefitting machine. Next, the resource scaling program 110a, 110b may still estimate the performance benefit for the user workload with an increased amount of resources at 204 to continually calculate the benefit the user may have available at the current workload.

At 218, oscillation avoidance is performed. Oscillation avoidance (i.e., oscillation control) may control the cloud application resources running on virtual machines from oscillating between more and less resources. The resource scaling program 110a, 110b may identify oscillating resources reaching an optimal level as the benefit curve may flatten out. As the benefit lowers for the virtual machine resource allocation, provided the amount of resources needed to keep the predetermined level of service as stated in the contracted SLA are given to the user, then resource allocation may remain the same in an effort to keep the virtual machine from oscillating between adding and removing a small amount of resources in an attempt to reach the best resource scenario. In the scenario where the resources may have exceeded the amount needed to obtain the predetermined level of service, the service provider may remove resources from the cloud application running on a virtual machine if the service provider can accurately predict from the benefit curve and cost calculations the amount of resources that may be removed while maintaining the contracted level of service in the SLA. Performing oscillation avoidance may deter the resources from unnecessary oscillations when the predetermined level of service has been satisfied. Then, the resource scaling program 110a, 110b returns to 204.

For example, user A is operating a personal computer and is running two small programs and an operating system. User B is operating a personal computer, is multitasking and running 10 large programs and an operating system. User A and user B have purchased the same service level in the SLA. User A needs 32 GB of memory to perform computing operations with a specified response time for the current workload. User B needs 256 GB of memory to perform computing operations with a specified response time for the current workload. The resource scaling program 110a, 110b may provision the excess resources not being used by user A to user B and the service level of both user A and user B remains consistent within the SLA even though user A's resources may have gone down one or two tiers while user B resources may have gone up one or two tiers to maintain the predetermined level of service in the SLA.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
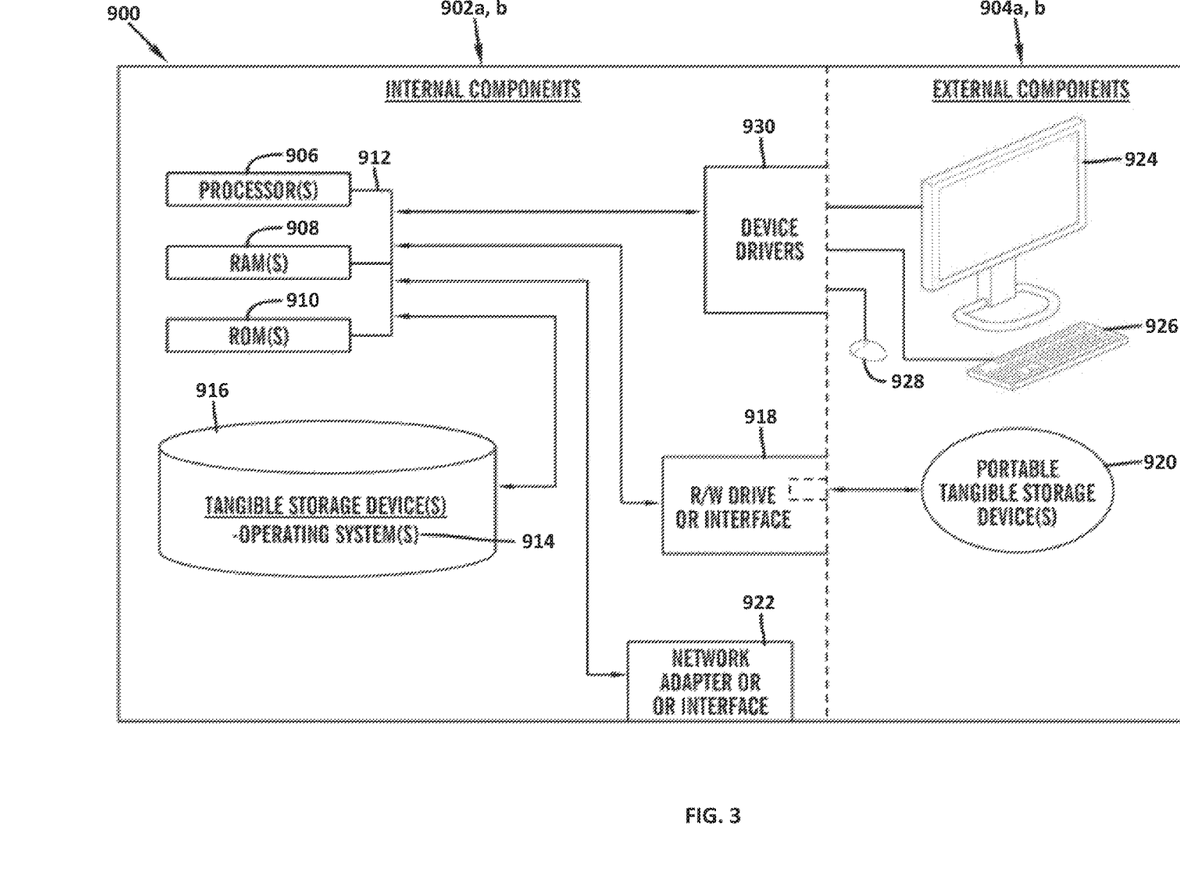
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the resource scaling program 110a in client computer 102, and the resource scaling program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the resource scaling program 110a, 110b can be stored on one or more of the respective portable computer-readable tangible storage devices 920, read via the respective R/W drive or interface 918, and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the resource scaling program 110a in client computer 102 and the resource scaling program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the resource scaling program 110a in client computer 102 and the resource scaling program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
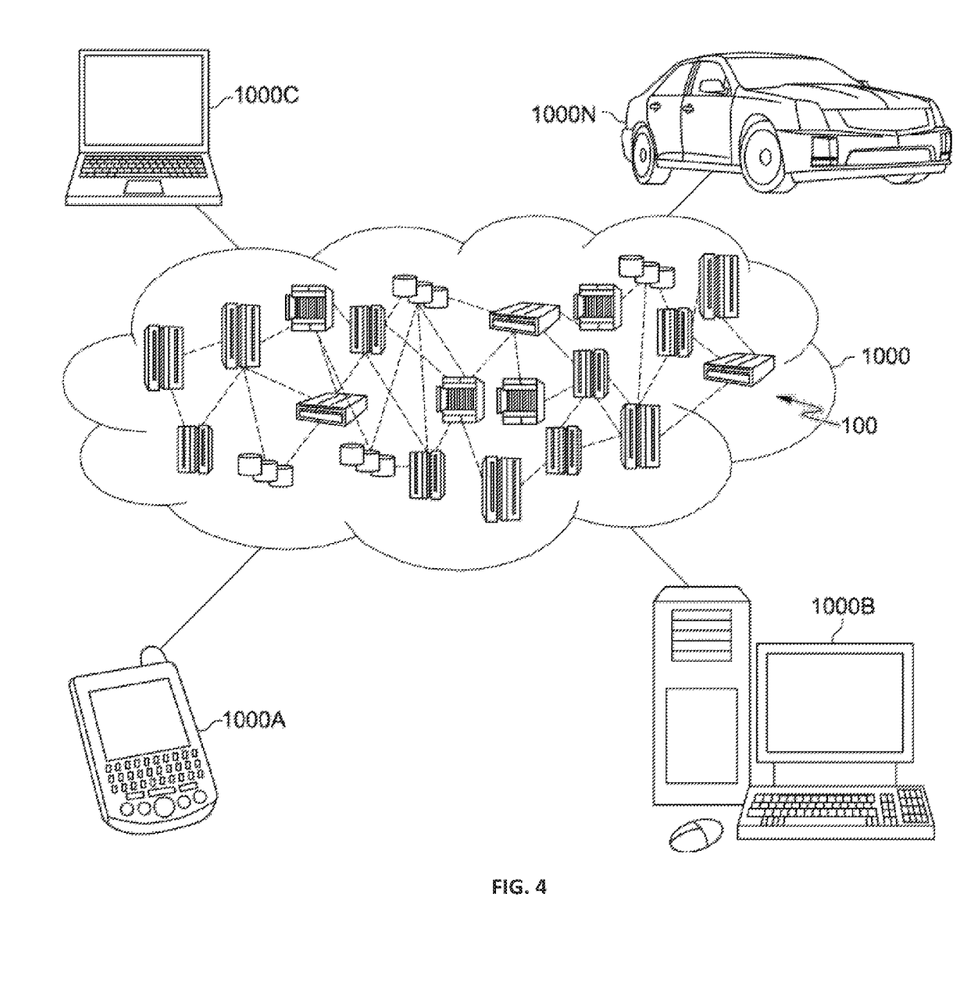
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
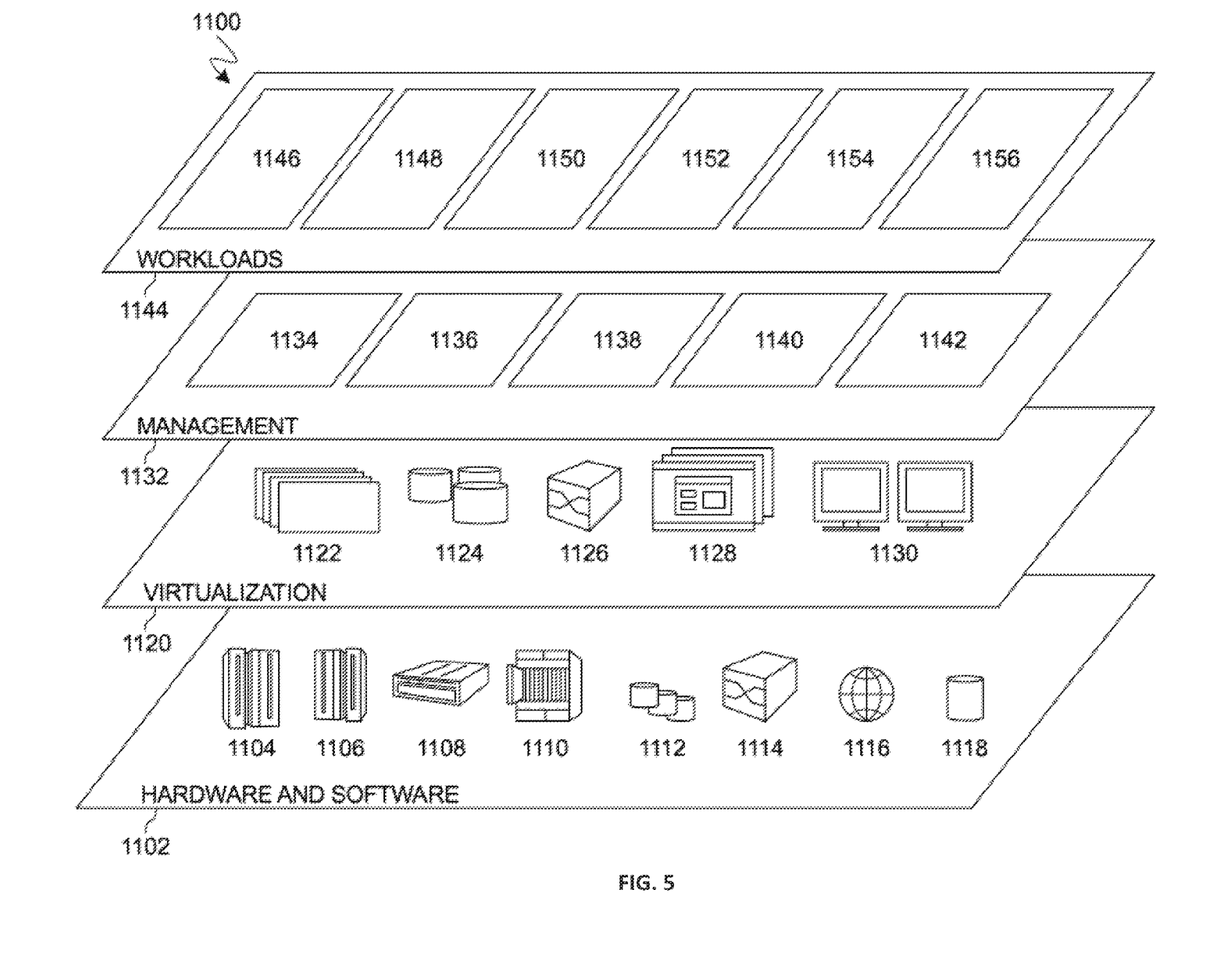
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and resource scaling 1156. A resource scaling program 110a, 110b provides a way to allocate resources across a plurality of computing devices over a communication network 116.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for resource scaling in a cloud environment, the method comprising:
   receiving a request for a plurality of resources from a virtual device;
   estimating a resource allocation based on a predetermined level of service based on the received request;
   estimating a benefit curve of a workload for a plurality of tiers of resources based on the estimated resource allocation;
   estimating a performance cost of the workload for the plurality of tiers of resources based on the estimated benefit curve;
   adjusting, automatically, the resource allocation based on the current workload of the virtual device, wherein the adjusted resource allocation keeps the benefit curve of the virtual device from oscillation by refraining subsequent adding or removing of resources; and
   identifying the benefit curve of an oscillating resource is reaching an optimal level based on the adjusted resource allocation.

2. The method of claim 1, further comprising:
   determining that the predetermined level of service has not been satisfied;
   allocating an additional portion of resources to the virtual device to satisfy the predetermined level of service; and
   performing oscillation avoidance based on the allocated additional portion of resources.

3. The method of claim 1, further comprising:
   determining that the predetermined level of service has been satisfied;
   determining that the predetermined level of service has not been exceeded;
   maintaining a current portion of resources allocated to satisfy the predetermined level of service; and
   performing oscillation avoidance based on the maintained current portion of resources.

4. The method of claim 1, further comprising:
   determining that the predetermined level of service has been satisfied;
   determining that the predetermined level of service has been exceeded;
   removing a portion of resources allocated to satisfy the predetermined level of service; and
   performing oscillation avoidance based on the removed portion of resources.

5. The method of claim 1, wherein the benefit curve is estimated to automatically provision a plurality of virtual machine resources over a communication network from a service provider to a user based on a predetermined level of service, wherein the predetermined level of service is determined in a service level agreement between the service provider and the user, and wherein the predetermined level of service is selected from a group consisting of a performance benefit and a performance cost.

6. The method of claim 1, wherein the benefit curve is estimated to provide resource data provisioned in a plurality of virtual machine resources over a communication network from a service provider to a user, wherein the provided resource data is presented to the user from the service provider, and wherein the user determines to purchase the predetermined level of service.

7. The method of claim 1, wherein the benefit curve is estimated to provide resource data provisioned in a plurality of virtual machine resources over a communication network to a service provider to target at least one user, advertise to the at least one user and offer an upgraded service to the at least one user.

8. A computer system for resource scaling in a cloud environment, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a request for a plurality of resources from a virtual device;
estimating a resource allocation based on a predetermined level of service based on the received request;
estimating a benefit curve of a workload for a plurality of tiers of resources based on the estimated resource allocation;
estimating a performance cost of the workload for the plurality of tiers of resources based on the estimated benefit curve;
adjusting, automatically, the resource allocation based on the current workload of the virtual device, wherein the adjusted resource allocation keeps the benefit curve of the virtual device from oscillation by refraining subsequent adding or removing of resources; and
identifying the benefit curve of an oscillating resource is reaching an optimal level based on the adjusted resource allocation.

9. The computer system of claim 8, further comprising:
determining that the predetermined level of service has not been satisfied;
allocating an additional portion of resources to the virtual device to satisfy the predetermined level of service; and
performing oscillation avoidance based on the allocated additional portion of resources.

10. The computer system of claim 8, further comprising:
determining that the predetermined level of service has been satisfied;
determining that the predetermined level of service has not been exceeded;
maintaining a current portion of resources allocated to satisfy the predetermined level of service; and
performing oscillation avoidance based on the maintained current portion of resources.

11. The computer system of claim 8, further comprising:
determining that the predetermined level of service has been satisfied;
determining that the predetermined level of service has been exceeded;
removing a portion of resources allocated to satisfy the predetermined level of service; and
performing oscillation avoidance based on the removed portion of resources.

12. The computer system of claim 8, wherein the benefit curve is estimated to automatically provision a plurality of virtual machine resources over a communication network from a service provider to a user based on a predetermined level of service, wherein the predetermined level of service is determined in a service level agreement between the service provider and the user, and wherein the predetermined level of service is selected from a group consisting of a performance benefit and a performance cost.

13. The computer system of claim 8, wherein the benefit curve is estimated to provide resource data provisioned in a plurality of virtual machine resources over a communication network from a service provider to a user, wherein the provided resource data is presented to the user from the service provider, and wherein the user determines to purchase the predetermined level of service.

14. The computer system of claim 8, wherein the benefit curve is estimated to provide resource data provisioned in a plurality of virtual machine resources over a communication network to a service provider to target at least one user, advertise to the at least one user and offer an upgraded service to the at least one user.

15. A computer program product for resource scaling in a cloud environment, comprising:
one or more computer-readable storage medium and program instructions stored on at least one of the one or more tangible storage medium, the program instructions executable by a processor, the program instructions comprising:
program instructions to receive a request for a plurality of resources from a virtual device;
program instructions to estimate a resource allocation based on a predetermined level of service based on the received request;
program instructions to estimate a benefit curve of a workload for a plurality of tiers of resources based on the estimated resource allocation;
program instructions to estimate a performance cost of the workload for the plurality of tiers of resources based on the estimated benefit curve;
program instructions to adjust, automatically, the resource allocation based on the current workload of the virtual device, wherein the adjusted resource allocation keeps the benefit curve of the virtual device from oscillation by refraining subsequent adding or removing of resources; and
program instructions to identify the benefit curve of an oscillating resource is reaching an optimal level based on the adjusted resource allocation.

16. The computer program product of claim 15, further comprising:
program instructions to determine that the predetermined level of service has not been satisfied;
program instructions to allocate an additional portion of resources to the virtual device to satisfy the predetermined level of service; and
program instructions to perform oscillation avoidance based on the allocated additional portion of resources.

17. The computer program product of claim 15, further comprising:
program instructions to determine that the predetermined level of service has been satisfied;
program instructions to determine that the predetermined level of service has not been exceeded;
program instructions to maintain a current portion of resources allocated to satisfy the predetermined level of service; and
program instructions to perform oscillation avoidance based on the maintained current portion of resources.

18. The computer program product of claim 15, further comprising:
program instructions to determine that the predetermined level of service has been satisfied;
program instructions to determine that the predetermined level of service has been exceeded;
program instructions to remove a portion of resources allocated to satisfy the predetermined level of service; and
program instructions to perform oscillation avoidance based on the removed portion of resources.

19. The computer program product of claim 15, wherein the benefit curve is estimated to automatically provision a plurality of virtual machine resources over a communication network from a service provider to a user based on a predetermined level of service, wherein the predetermined level of service is determined in a service level agreement between the service provider and the user, and wherein the predetermined level of service is selected from a group consisting of a performance benefit and a performance cost.

20. The computer program product of claim 15, wherein the benefit curve is estimated to provide resource data provisioned in a plurality of virtual machine resources over a communication network from a service provider to a user, wherein the provided resource data is presented to the user from the service provider, and wherein the user determines to purchase the predetermined level of service.

* * * * *